US011215149B2

(12) United States Patent
Gomibuchi et al.

(10) Patent No.: US 11,215,149 B2
(45) Date of Patent: *Jan. 4, 2022

(54) AIR CLEANER

(71) Applicant: HONDA MOTOR CO., LTD., Tokyo (JP)

(72) Inventors: Shota Gomibuchi, Wako (JP); Wataru Yamazaki, Wako (JP); Hiroto Takahashi, Wako (JP); Kosaku Nakano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 737 days.

This patent is subject to a terminal disclaimer.

(21) Appl. No.: 16/071,254

(22) PCT Filed: Jan. 6, 2017

(86) PCT No.: PCT/JP2017/000338
§ 371 (c)(1),
(2) Date: Jul. 19, 2018

(87) PCT Pub. No.: WO2017/130665
PCT Pub. Date: Aug. 3, 2017

(65) Prior Publication Data
US 2021/0199078 A1  Jul. 1, 2021

(30) Foreign Application Priority Data
Jan. 25, 2016  (JP) .............................. JP2016-011709

(51) Int. Cl.
 *B01D 45/12* (2006.01)
 *B01D 45/16* (2006.01)
(Continued)

(52) U.S. Cl.
 CPC .. *F02M 35/02483* (2013.01); *F02M 35/0201* (2013.01); *F02M 35/0216* (2013.01); *F02M 35/0223* (2013.01); *F02M 35/02416* (2013.01)

(58) Field of Classification Search
 CPC .............. B01D 46/0005; B01D 46/521; B01D 46/2411; B01D 45/08; F02M 35/02483;
(Continued)

(56) References Cited

U.S. PATENT DOCUMENTS 4,813,385 A * 3/1989 Yamaguchi ........ B01D 46/0024
123/2
7,637,978 B2 * 12/2009 Jung .................... F02M 35/022
55/457

(Continued)

FOREIGN PATENT DOCUMENTS

JP  61-108861 A  5/1986
JP  62-88873 U  6/1987

OTHER PUBLICATIONS

International Search Report dated Mar. 7, 2017, issued in counterpart application No. PCT/JP2017/000338. (4 pages).

(Continued)

*Primary Examiner* — Minh Chau T Pham
(74) *Attorney, Agent, or Firm* — Westerman, Hattori, Daniels & Adrian, LLP (57) ABSTRACT

An air cleaner includes a base member including a base wall extending substantially horizontally, and a cover member attached to an upper side of the base wall to jointly define a filter chamber for receiving a filter element therein. The air cleaner further includes a passage member communicating with the filter chamber and incorporated with a plurality of air ejection pipes each surrounded by an annular air inlet passage fitted with guide vanes for rotating the air flow, and a case member defining separation chambers for separating dust from the rotating air flow. The passage member is interposed between the cover member and the case member.

7 Claims, 11 Drawing Sheets

(51) Int. Cl.
*F02M 35/022* (2006.01)
*F02M 35/024* (2006.01)
*F02M 35/02* (2006.01)

(58) Field of Classification Search
CPC .......... F02M 35/0216; F02M 35/0201; F02M 35/0223; F02M 35/02416
USPC ...... 55/385.3, 337, 347, 498, 482, 443, 484, 55/502, 462–465; 123/198 E
See application file for complete search history.

(56) References Cited

U.S. PATENT DOCUMENTS

| | | | |
|---|---|---|---|
| 7,905,036 B2* | 3/2011 | Howell | G09F 3/207 40/1.5 |
| 8,657,900 B2* | 2/2014 | Menssen | B01D 46/0006 55/337 |
| 8,790,431 B2* | 7/2014 | Muenkel | B01D 46/0046 55/337 |
| 10,337,471 B2* | 7/2019 | Kaufmann | F02M 35/024 |
| 10,578,061 B2* | 3/2020 | Gomibuchi | F02M 35/0216 |
| 10,799,823 B2* | 10/2020 | Kaufmann | B01D 50/002 |
| 10,920,720 B2* | 2/2021 | Gomibuchi | B01D 50/002 |
| 10,961,957 B2* | 3/2021 | Kaufmann | B01D 46/522 |
| 2004/0094114 A1 | 5/2004 | Riehmann et al. | |
| 2004/0261754 A1 | 12/2004 | Uhl et al. | |
| 2007/0000134 A1* | 1/2007 | Uhl | B01D 50/002 30/130 |
| 2013/0255203 A1* | 10/2013 | Muenkel | B01D 46/0021 55/337 |

OTHER PUBLICATIONS

Written Opinion dated Mar. 7, 2017, issued in counterpart application No. PCT/JP2017/000338. (6 pages).
Notice of Reasons of Rejection dated Jun. 5, 2018, Issued in counterpart Japanese Patent Application No. 2016-011709, w/English translation (6 pages).
Office Action dated Sep. 30, 2019, issued in counterpart EP Application No. 17701598.9. (5 pages).

* cited by examiner

AIR CLEANER

TECHNICAL FIELD

The present invention relates to an air cleaner for an internal combustion engine, and in particular to an air cleaner provided with a plurality of cyclone dust collection units and a filter dust collection unit.

BACKGROUND ART

A known air cleaner for an internal combustion engine is provided with a cyclone dust collection unit and a filter dust collection unit that are connected in series in such a manner that dust with relatively large particle diameters are removed from the intake air in the cyclone dust collection unit and the intake air expelled from the cyclone dust collection unit is then forwarded to the filter dust collection unit to have dust of relatively small particle diameters removed from the forwarded intake air. See JPS61-108861A, for instance. According to this arrangement, the clogging of the filter element in the filter dust collection unit is reduced, and the interval of replacing the filter element can be thereby extended.

However, in the arrangement disclosed in JPS61-108861A, the cyclone dust collection unit having a relatively large size protrudes sideways from the filter dust collection unit, and the lateral dimension of the air cleaner is undesirably increased. In particular, the air cleaner protrudes from the otherwise rectangular outer profile of the engine, and this is detrimental when installing the engine in a limited space of a device that utilizes the power of the engine. Furthermore, the filter dust collection unit and the cyclone dust collection unit are constructed as mutually independent devices, and are connected to each other so as to jointly form the air cleaner. Therefore, the number of component parts is numerous, the overall structure is relatively complex, and the overall size is undesirably great.

SUMMARY OF INVENTION

In view of such a problem of the prior art, a primary object of the present invention is to minimize the size of an air cleaner having a cyclone dust collection unit and a filter dust collection unit.

According to the present invention, such an object can be accomplished by providing an air cleaner (32) for an internal combustion engine (1), comprising: a base member (41) including a base wall (41A) extending substantially horizontally, the base wall defining an outlet passage (41B) in a central part thereof; a cover member (42) attached to an upper side of the base wall to jointly define a filter chamber (70), a connecting chamber (75) extending from an upper part of the filter chamber in a prescribed direction, a passage chamber (76) connected to a lower end of the connecting chamber via a communication hole (72), and an air inlet (31) communicating the passage chamber with outside; a substantially annular filter element (43) positioned on the base wall inside the filter chamber and having an internal space communicating with the outlet passage; a passage member (44) including a plate-like base portion (44A) defining a lower end of the passage chamber, a plurality of circular holes (44B) passed through the base portion, a plurality of air ejection pipes (44C) having upper ends jointly connected to the communication hole in an air tight manner and extending through the corresponding circular holes of the base portion in a coaxial manner, an annular air inlet passage (44E) defined between each air ejection pipe and the corresponding circular hole, and a plurality of guide vanes (44D) extending radially between an outer circumferential surface of each air ejection pipe and an inner circumferential surface of the corresponding circular hole; and a case member (45) attached to a lower end of the passage member and defining cylindrical or conical separation chambers (45C) communicating with the respective annular air inlet passages and with lower ends of the respective air ejection pipes.

This arrangement allows the air cleaner incorporated with a filter dust collection unit and a plurality of cyclone dust collection units to be a highly simple in structure, and simplifies the assembling and the disassembling of the air cleaner. As the filter dust collection unit and the cyclone dust collection units share some of the component parts, the overall number of component parts can be reduced, and the air cleaner can be designed as a highly compact unit.

According to a preferred embodiment of the present invention, the passage member (44) comprises a flange (44F) that is commonly connected to the upper ends of the air ejection pipes, the flange having a peripheral part that abuts an annular shoulder surface (73) facing downward provided along a periphery of the communication hole (72).

Thereby, the passage member can be assembled to the cover member in a highly simple manner.

Preferably, the passage member (44) is interposed between the cover member (42) and the case member (45). Also, it may be arranged such that an upper end of the case member (45) abuts a lower surface of a peripheral part of the base portion (41A) and an annular shoulder surface (78) facing downward defined by the cover member (42).

Thereby, assembling of the passage member to the cover member can be particularly simplified.

According to a particularly preferred embodiment of the present invention, the guide vanes (44D) are arranged in each annular air inlet passage at a regular angular interval, and are inclined with respect to a plane perpendicular to an axial direction of the corresponding annular air inlet passage by an angle of 30 degrees to 37 degrees.

Thereby, the dust removal ratio of the cyclone dust collection units can be maximized without unduly increasing the flow resistance (or without unduly limiting the air flow rate).

The guide vanes may be configured not to overlap one another as seen in the axial direction of the corresponding annular air inlet passage so that the guide vanes may be manufactured by injection molding or any other die molding process using plastic material.

Preferably, the separation chambers are defined by respective cup members projecting downward from a common flange provided in an upper end of the case member so that the separation chambers and hence the cyclone dust collection units may be formed by using a small number of component parts.

Thus, in the most preferred embodiment of the present invention, the air cleaner incorporated with a filter dust collection unit and a plurality of cyclone dust collection units can be constructed as a highly simple and compact unit.

DESCRIPTION OF EMBODIMENTS

A preferred embodiment of the present invention is described in the following with reference to the appended drawings.

Figure 1:
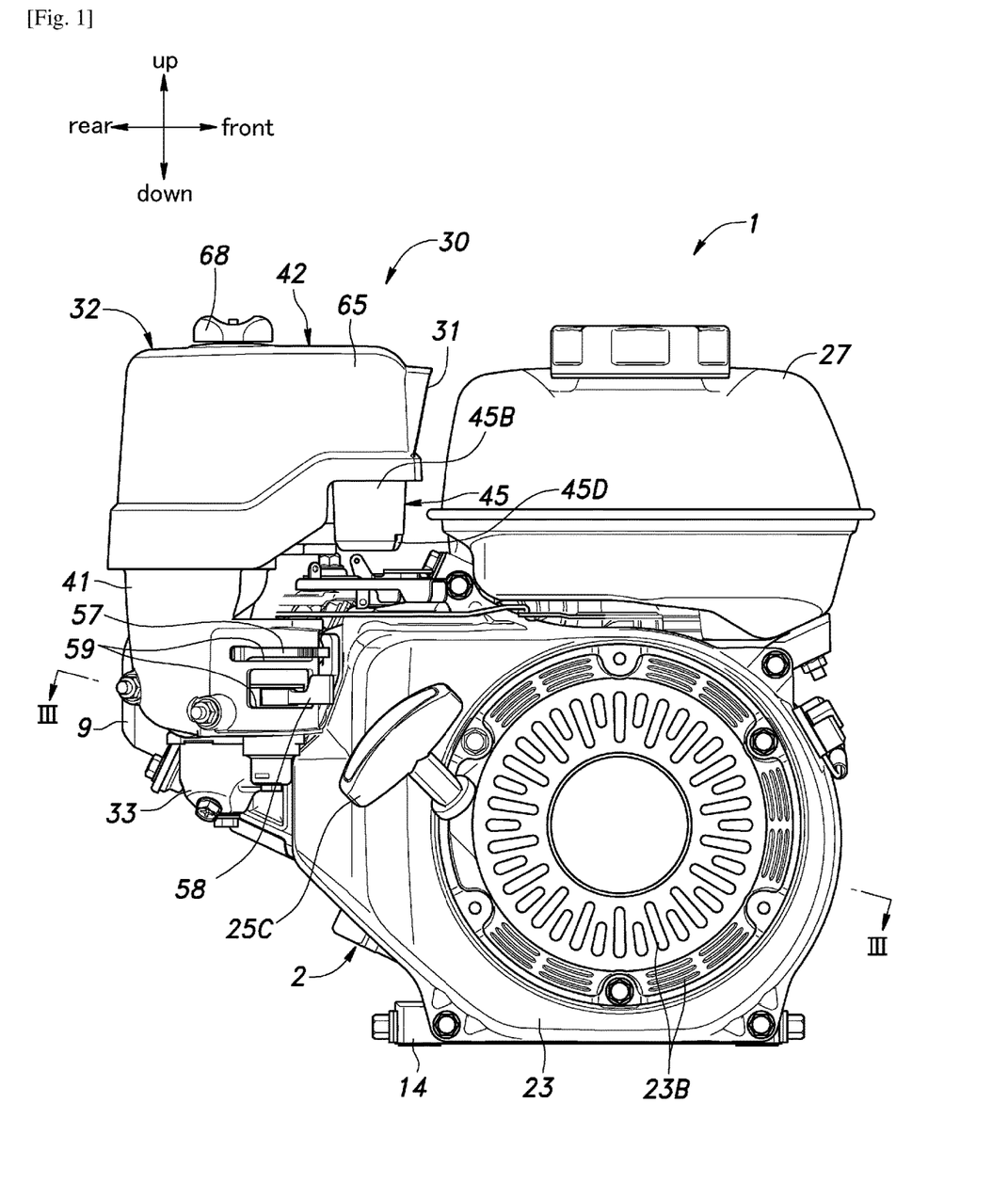
FIG. 1 is a side view of a general-purpose engine provided with an air cleaner embodying the present invention.
Figure 2:
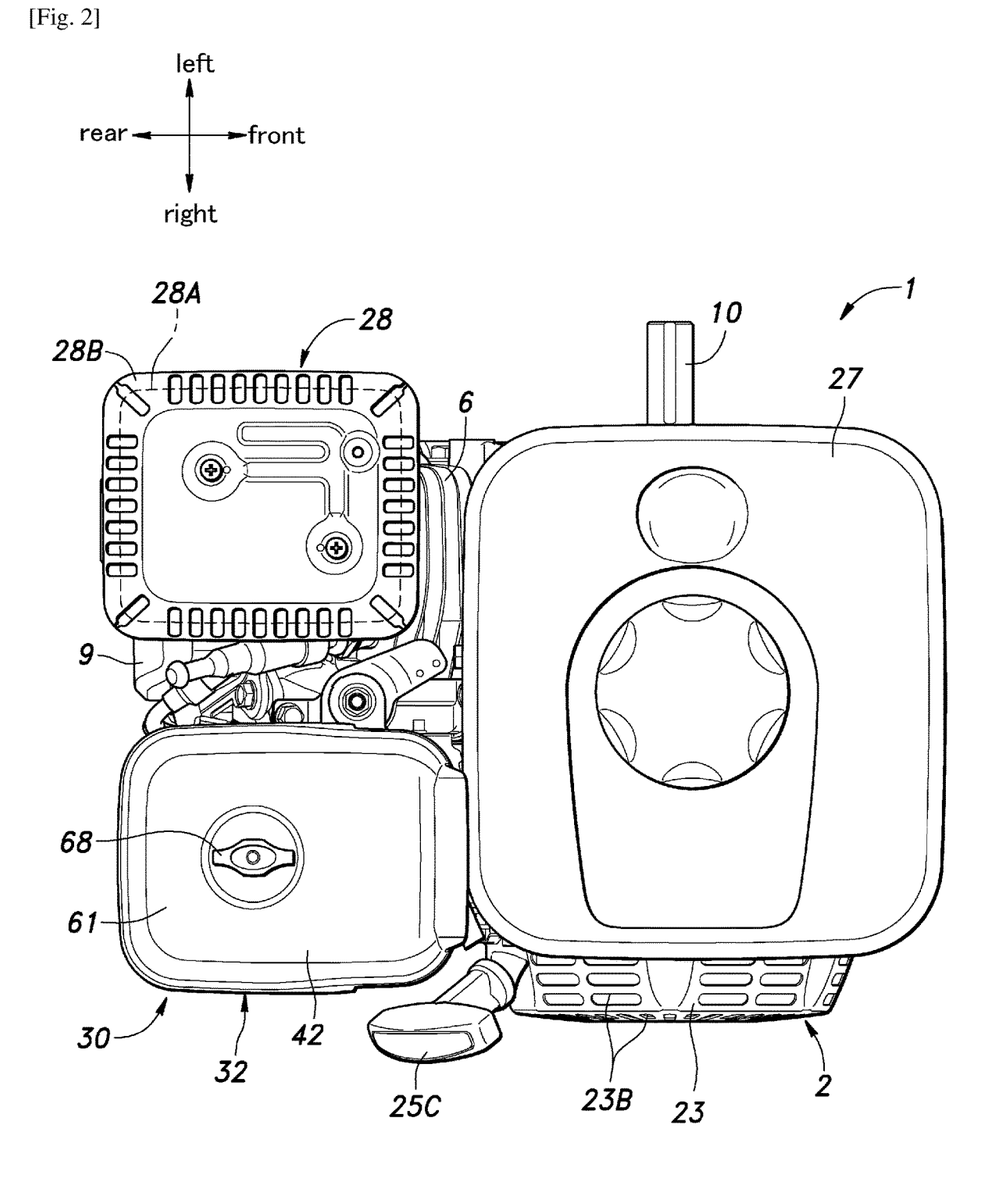
FIG. 2 is a plan view of the engine.
Figure 3:
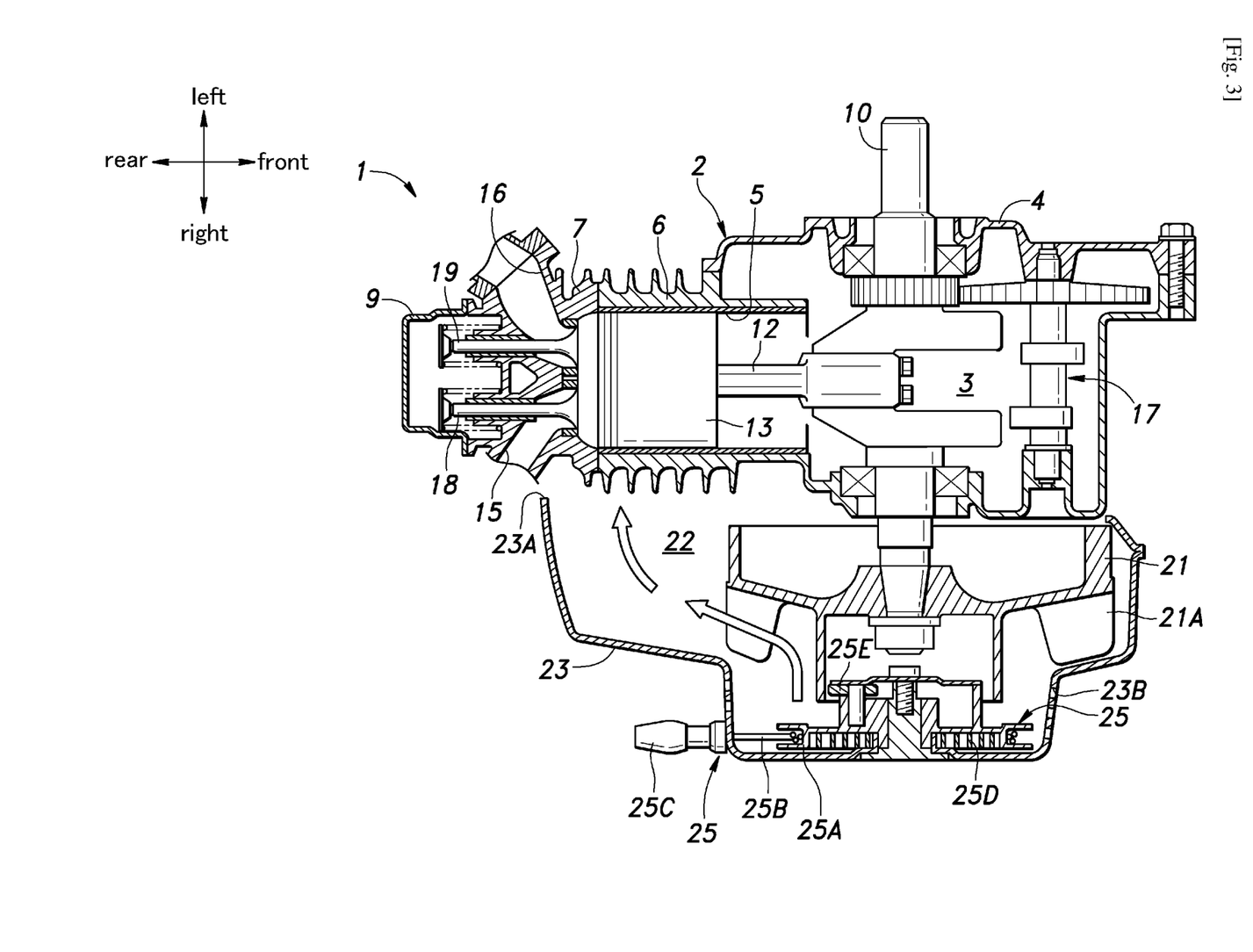
FIG. 3 is a sectional view taken along line III-III of FIG. 1.

As shown in FIGS. 1 to 3, the engine 1 consists of a single cylinder engine including an engine main body 2 having a rearwardly slanted cylinder axial line. The engine main body 2 includes a crankcase 4 internally defining a crankcase chamber 3, a cylinder block 6 extending from an upper rear part of the crankcase 4 in a rearwardly and upwardly direction and internally defining a cylinder 5 communicating with the crankcase chamber 3, a cylinder head 7 connected to the upper end of the cylinder block 6 and closing the upper end of the cylinder 5, and a head cover 9 connected to the cylinder head 7 to define a valve actuating chamber jointly with the cylinder head 7. A crankshaft 10 extending laterally is rotatably supported by the crankcase 4, and a piston 13 connected to the crankshaft 10 via a connecting rod 12 is received in the cylinder 5 for a reciprocating movement along the cylinder axial line in a per se known manner. A plurality of legs 14 are provided on the bottom part of the crankcase 4 for supporting the engine main body 2 on an engine mount of a device that utilizes the power of the engine 1.

The cylinder head 7 is formed with an intake port 15 and an exhaust port 16 communicating with the cylinder 5. The intake port 15 extends rightward from the cylinder 5 and opens out on the right side face of the cylinder head 7, and the exhaust port 16 extends leftward from the cylinder 5 and opens out on the left side face of the cylinder head 7. The intake port 15 and the exhaust port 16 are provided with an intake valve 18 and an exhaust valve 19, respectively, which are actuated by the crankshaft 10 via a valve actuating mechanism 17 mainly placed in the valve actuating chamber. The valve actuating mechanism 17 may consist of a per se known OHV (overhead valve) mechanism.

The left end and the right end of the crankshaft 10 are passed out of the side wall of the crankcase 4, and project outward. The left end of the crankshaft 10 corresponds to the output end of the engine 1, and the right end of the crankshaft 10 is fitted with a flywheel 21 consisting of a disk member. The outer end surface or the right end surface of the flywheel 21 is provided with a plurality of vanes 21A, and thereby forms a centrifugal fan for cooling the engine 1.

The right side end of the crankcase 4 and the cylinder block 6 is covered by an engine cover 23 which defines a cooling air passage 22 jointly with the crankcase 4 and the cylinder block 6, and the flywheel 21 is received in this cooling air passage 22. The front and lower edges of the engine cover 23 are positioned adjacent to the outer surface of the crankcase 4, and the upper and rear edges of the engine cover 23 are positioned adjacent to the cylinder head 7. The engine cover 23 extends along the flywheel 21 and the associated components with a relatively small gap, but defines an air flow passage of a relatively large cross sectional area extending in the fore and aft direction and around the cylinder block 6 which is provided with cooling fins. A cooling air outlet 23A is defined by the gap between the upper rear edge of the engine cover 23 and the cylinder block 6. An annular region concentrically opposing the flywheel 21 is formed with a plurality of through holes serving as a cooling air inlet 23B. Thus, when the engine 1 is in operation, and the flywheel 21 is rotating, cooling air is introduced into the cooling air passage 22 via the cooling air inlet 23B, and flows in a rearward direction before being expelled from the cooling air outlet 23A in an upward and rearward direction as indicated by white arrows in FIG. 3.

The engine cover 23 is fitted with a recoil starter 25 that includes a pulley 25A coaxially and rotatably supported on the back side of the engine cover 23, a rope 25B having one end attached to the pulley 25A and wound around the pulley 25A, a grip 25C attached to the outer end of the rope 25B which is passed through a small hole formed in the engine cover 23, a spiral spring 25D interposed between the engine cover 23 and the pulley 25A to urge the pulley 25A in the direction to wind the rope 25B around the pulley 25A, a one-way clutch 25E which transmits torque from the pulley 25A to the flywheel 21 but not in the opposite direction. The grip 25C is positioned such that the rope 25B may be pulled in a tangential direction of the pulley 25A which is directed in a rearwardly and upwardly direction.

A substantially rectangular fuel tank 27 is supported by the crankcase 4 via support arms (not numbered) so as to be positioned above the crankcase 4 and the engine cover 23. The lateral width of the fuel tank 27 is substantially equal to the combined lateral width of the crankcase 4 and the engine cover 23 so that a substantially rectangular outer profile may be jointly defined.

An exhaust system 28 communicating with the exhaust port 16 is connected to the left side of the cylinder head 7. The exhaust system 28 internally defines an exhaust passage, and a muffler 28A is connected to the downstream end thereof. The muffler 28A is surrounded by a substantially rectangular protective cover 28B, and positioned above the cylinder head 7 and to the rear of the left half of the fuel tank 27 so that the exhaust gas is expelled in a rearward direction.

An intake system 30 communicating with the intake port 15 is connected to the right side of the cylinder head 7. The intake system 30 internally defines an intake passage. An air cleaner 32 having an air inlet 31 is connected to the upstream end of the intake passage, and a carburetor 33 is connected between the air cleaner 32 and the intake port 15. The carburetor 33 is positioned to the right of the cylinder head 7 and to the rear of the engine cover 23. The air cleaner 32 is positioned above and to the right of the cylinder head 7, and above the carburetor 33. Also, the air cleaner 32 is positioned to the rear of the right half of the fuel tank 27 and to the right of the muffler 28A. The air cleaner 32, the muffler 28A (protective cover 28B) and the fuel tank 27 jointly define a substantially horizontal upper profile of the engine 1.

As shown in FIGS. 4 to 8, the air cleaner 32 includes three cyclone dust collection units 34 connected to the air inlet 31 in parallel to one another, and a filter dust collection unit 35 connected to the downstream ends of the cyclone dust collection units 34. Each cyclone dust collection unit 34 guides the supplied air into a spiral flow, and separates dust from the air by centrifugal force. The filter dust collection unit 35 separates dust further from the air that has passed through the cyclone dust collection units 34 by filtration.

Figure 4:
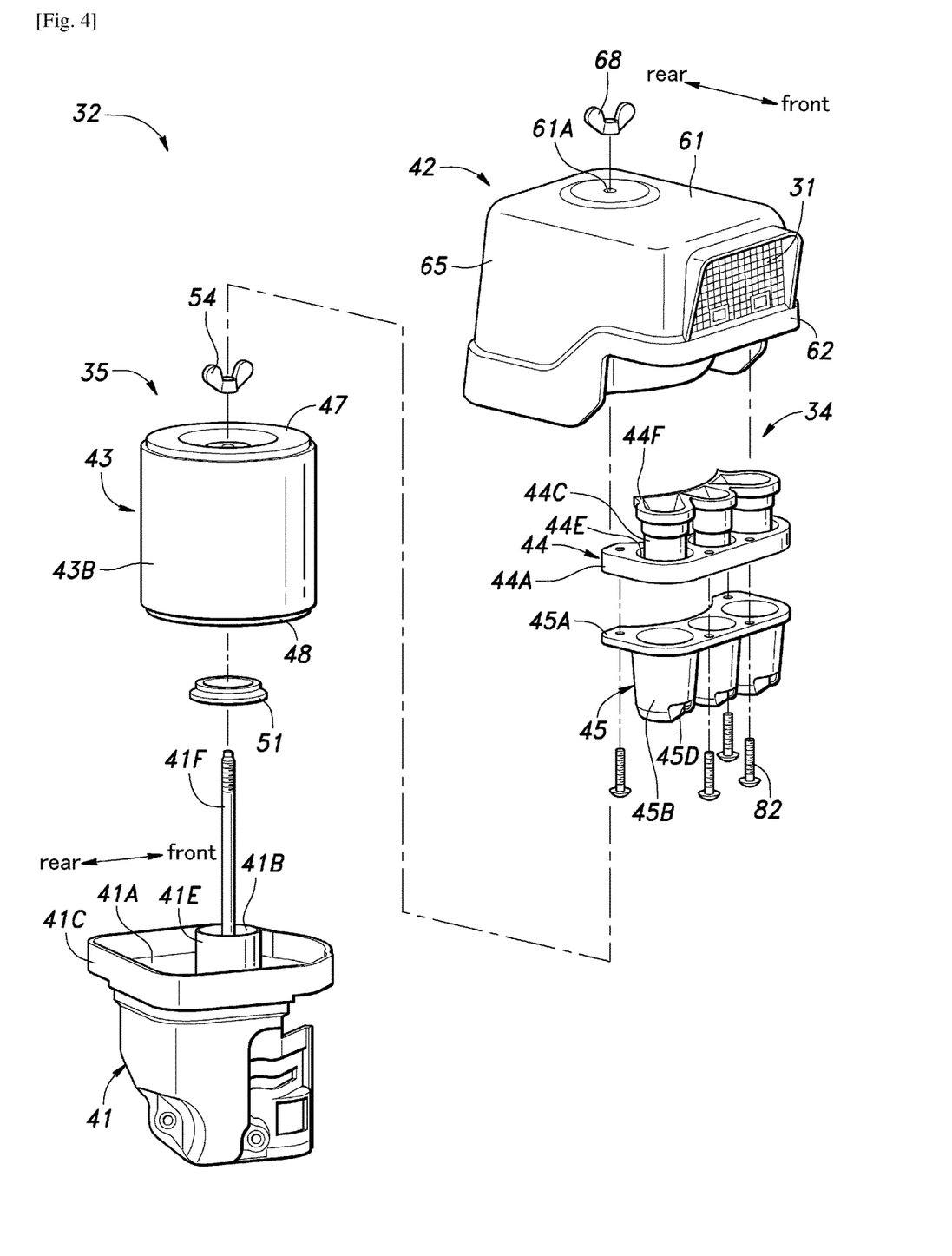
FIG. 4 is an exploded perspective view of the air cleaner.

As shown in FIG. 4, the air cleaner 32 includes a base member 41, a cover member 42, a filter element 43, a passage member 44 and a case member 45. The base member 41, the cover member 42 and the filter element 43 jointly form the filter dust collection unit 35. The cover member 42, the passage member 44 and the case member 45 jointly form the cyclone dust collection units 34. The passage member 44 and the case member 45 jointly form the main body of the individual cyclone dust collection units 34.

Figure 6:
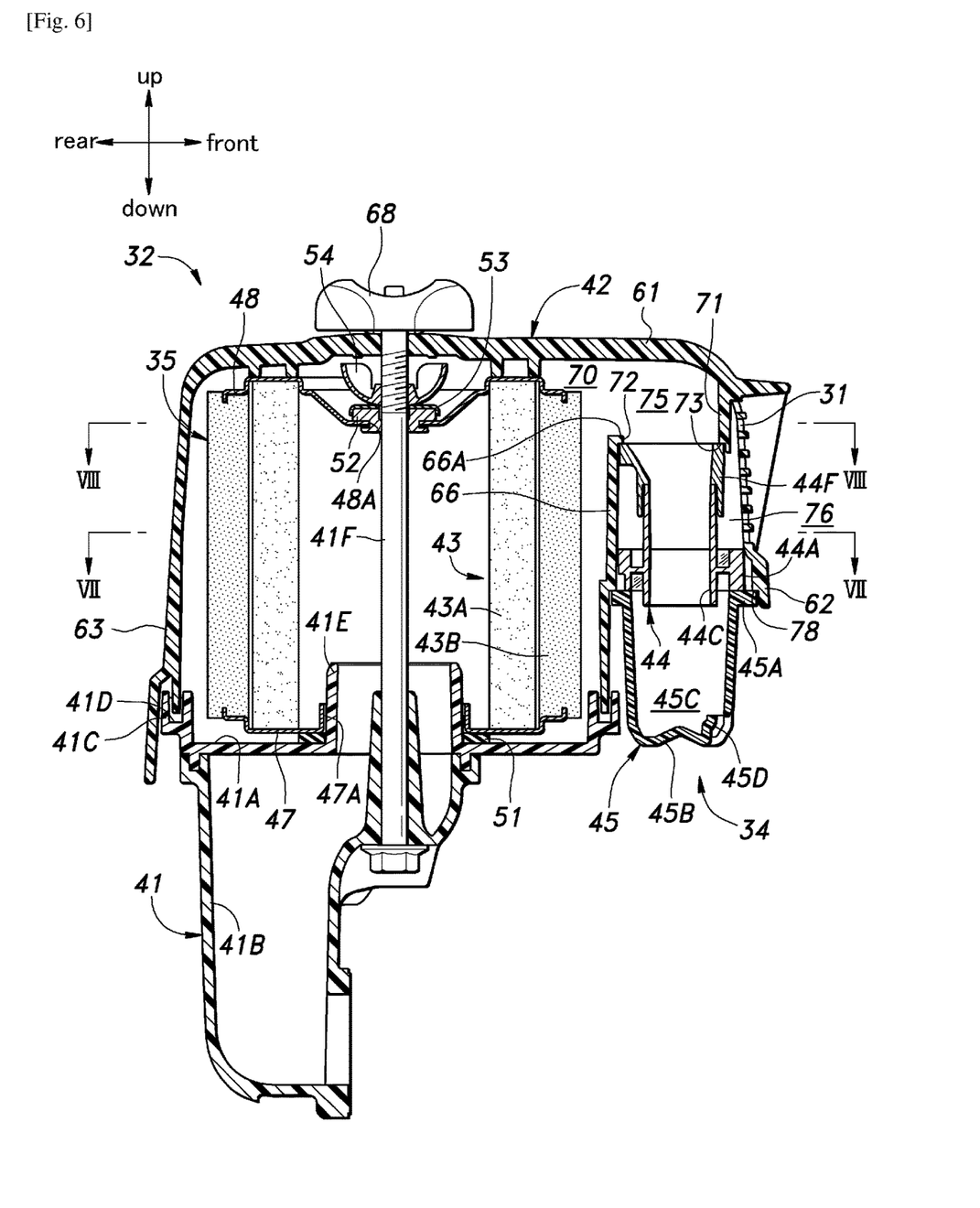
FIG. 6 is a vertical sectional view of the air cleaner.

As shown in FIGS. 4 and 6, the base member 41 extends vertically, and defines a planar base wall 41A. The base member 41 internally defines a vertically extending outlet passage 41B. The upper end of the outlet passage 41B is formed by a circular opening provided centrally in the base wall 41A, and the lower end of the outlet passage 41B opens out in a lower front part of the base member 41. The base wall 41A is surrounded by a vertically extending annular peripheral wall 41C having a prescribed height, and the peripheral wall 41C includes a rear section extending linearly in the lateral direction along the rear edge of the base wall 41A, a pair of side sections extending linearly in the fore and aft direction along either side of the base wall 41A and a front section extending along an arc concentric to the upper end of the outlet passage 41B. The upper end of the peripheral wall 41C is provided with an engagement groove 41D extending along the entire length thereof. A cylindrical wall 41E projects from the part of the base wall 41A surrounding the outlet passage 41B proud of the peripheral wall 41C. A lower end of a connecting shaft 41F is secured to an inner wall extending horizontally in a vertically middle part of the base member 41, and extends vertically through the center of the upper end of the outlet passage 41B. The connecting shaft 41F extends out of the base wall 41A by a prescribed length, and is provided with a male thread in an upper end part thereof.

As shown in FIG. 1, a lower right part of the base member 41 is provided with openings 59 for passing a choke lever 57 for operating a choke valve (not shown in the drawings) of the carburetor 33 and a fuel shutoff valve lever 58 for operating a fuel shutoff valve (not shown in the drawings) for selectively shutting off the communication between the fuel tank 27 and the carburetor 33. The choke lever 57 and the fuel shutoff valve lever 58 project from the right side of the engine 1.

The grip 25C, the choke lever 57 and the fuel shutoff valve lever 58 are thus positioned so as to be optimally accessible for the operator of the engine 1 standing to the right and rear of the engine 1.

The filter element 43 includes a cylindrical and annular first filter element 43A and a cylindrical and annular second filter element 43B positioned concentrically outside of the first filter element 43A. The first filter element 43A and the second filter element 43B are connected to each other by a first end plate 47 at the first axial ends thereof and by a second end plate 48 at the second axial ends thereof. Each of the end plates 47 and 48 is formed by a circular disk, and closes the interior of the first filter element 43A and the second filter element 43B from the corresponding ends thereof. The first end plate 47 is centrally formed with a first opening 47A, and the second end plate 48 is also centrally formed with a substantially smaller second opening 48A. The filter element 43 is positioned on top of the base wall 41A such that the cylindrical wall 41E fits into the first opening 47A, and the connecting shaft 41F extends centrally through the second opening 48A. An annular first seal member 51 is fitted on the cylindrical wall 41E so that the lower surface of the first end plate 47 and the base wall 41A abut each other so as to seal off the first opening 47A from the exterior of the filter element 43. An annular second seal member 52 is placed on the part of the first end plate 47 surrounding the second opening 48A, and the connecting shaft 41F is passed through the central opening of the second seal member 52 to close the second opening 48A in an air tight manner. A first wing nut 54 is threaded onto the male thread of the connecting shaft 41F, and abuts the upper surface of the second seal member 52 via a washer 53 so that the first end plate 47, the second end plate 48 and the filter element 43 are fixedly secured to the base member 41.

As shown in FIG. 4 and FIGS. 6 to 8, the cover member 42 includes a rectangular upper wall 61 and a tubular side wall depending from the rectangular outer edge of the upper wall 61, the side wall including a front wall 62, a rear wall 63, a left side wall 64 and a right side wall 65. The cover member 42 further includes a partition wall 66 extending between the left side wall 64 and the right side wall 65. The upper edge of the partition wall 66 is spaced from the upper wall 61. The lower edge of the partition wall 66 is substantially at the same elevation as the lower edge of the part of the side wall located behind the partition wall 66 (the rear wall 63, a rear part of the left side wall 64 and a rear part of the right side wall 65). The lower edge of the remaining part of the side wall (the front wall 62, a front part of the left side wall 64 and a front part of the right side wall 65) is located at a higher elevation than the lower edge of the part of the side wall located behind the partition wall 66. In other words, the front lower part of the side wall is cut away as opposed to the rear lower part of the side wall.

The rear part of the side wall, the partition wall 66 and the upper wall 61 jointly define a recess or a filter chamber 70 opening out in the downward direction, and the base wall 41A of the base member 41 serves as the bottom wall of the filter chamber 70. The lower edge of the part of the side wall located behind the partition wall 66 is conformal to the upper edge of the peripheral wall 41C of the base member 41, and is fitted into the engagement groove 41D formed in the upper edge of the peripheral wall 41C of the base member 41. The upper end of the connecting shaft 41F extends through an opening 61A formed in the upper wall 61, and projects upward from the cover member 42. A second wing nut 68 threaded onto the male thread of the connecting shaft 41F fixedly secures the cover member 42 to the base member 41.

The filter chamber 70 defined jointly by the rear part of the side wall, the partition wall 66 and the upper wall 61 receives the filter element 43 therein. The partition wall 66 is given with a curve formed as an arc centered around the central axial line of the filter element 43 or the central axial line of the connecting shaft 41F, and is spaced from the outer circumferential surface of the filter element 43.

The upper edge of the partition wall 66 is provided with a flange 66A projecting in the forward direction, and extending along the length of the partition wall 66. The lower surface of the flange 66A defines a planar shoulder surface. A passage wall 71 curved in plan view so as to have three lobes extending substantially in a forward direction depends from the front part of the lower surface of the upper wall 61 or a part of the lower surface of the upper wall 61 located between the partition wall 66 and the front wall 62. The two lateral ends of the passage wall 71 extend in a rearward direction, and are connected to the partition wall 66. The flange 66A and the passage wall 71 jointly define a vertically extending communication passage 72, and the lower surface of the flange 66A and the lower edge of the passage wall 71 jointly define a continuous annular shoulder surface 73 facing downward.

Figure 7:
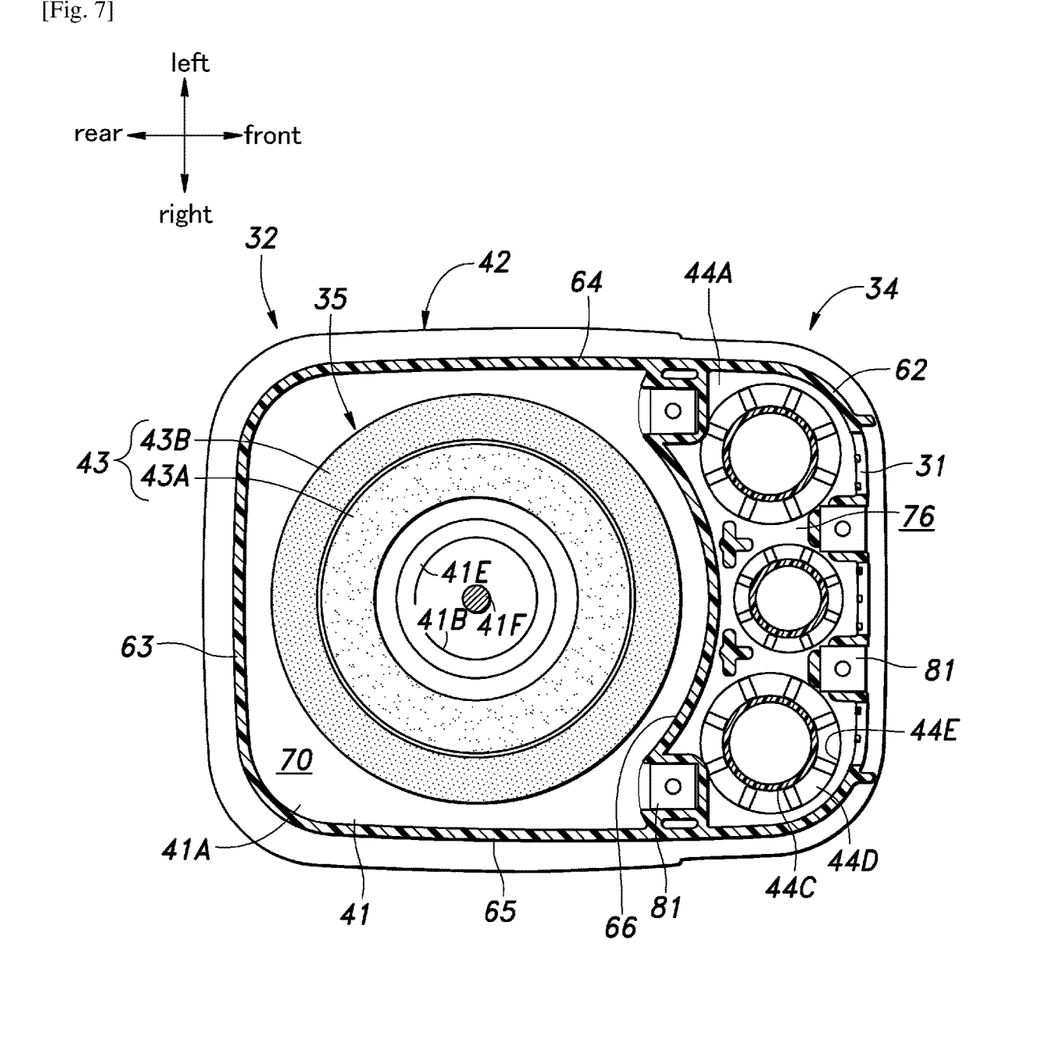
FIG. 7 is a sectional view taken along line VII-VII of FIG. 6.
Figure 8:
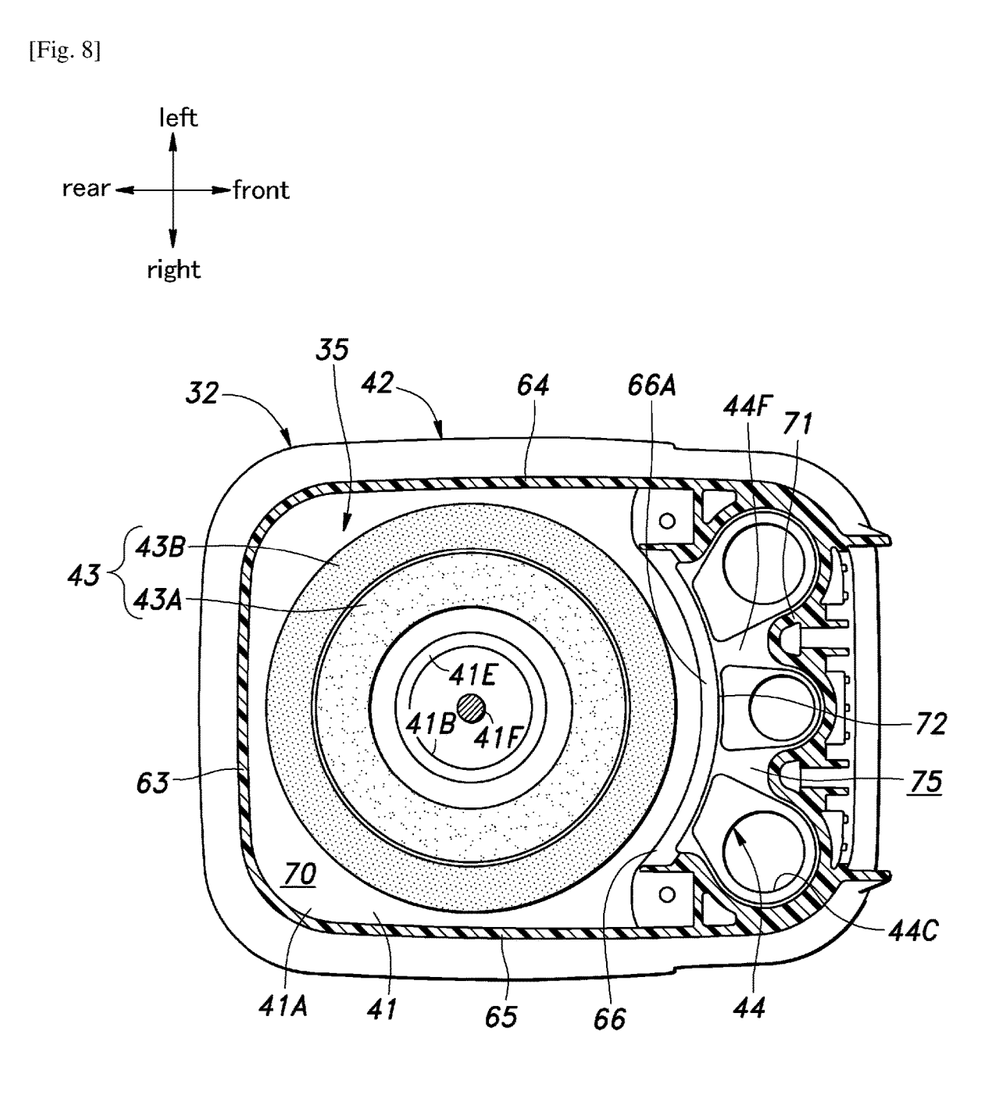
FIG. 8 is a sectional view taken along line VIII-VIII of FIG. 6.

The upper wall 61 and the passage wall 71 jointly define a connecting chamber 75 opening out both in a rearward direction and a downward direction. As the connecting chamber 75 extends from the upper front end of the filter chamber 70 in a forward direction, the connecting chamber 75 may be considered as an extension of the filter chamber 70. A passage chamber 76 is defined by the front wall 62, the partition wall 66, the front part of the left side wall 64 and the front part of the right side wall 65.

The air inlet 31 is formed in the front wall 62, and communicates with the passage chamber 76. In the illustrated embodiment, the air inlet 31 is passed through the front wall 62 in the fore and aft direction, and is formed by a large number of small holes forming a mesh.

As shown in FIGS. 4 to 8, the passage member 44 is provided with a plate-like base portion 44A extending horizontally so as to close the lower end of the passage chamber 76. The base portion 44A is provided with a linear front edge and an arcuate rear edge in conformity with the cross sectional shape of the passage chamber 76. In particular, the lateral end parts of the rear edge protrude rearwardly in comparison with the middle part of the rear edge. Three circular holes 44B arranged along the lateral direction are passed through the base portion 44A. The middle circular hole 44B has a relatively small diameter than the remaining two circular holes 44B having a relatively large diameter and arranged symmetric about the line passing through the central axial line of the middle circular hole 44B and the central axial line of the filter elements 43A and 43B.

Figure 5A:
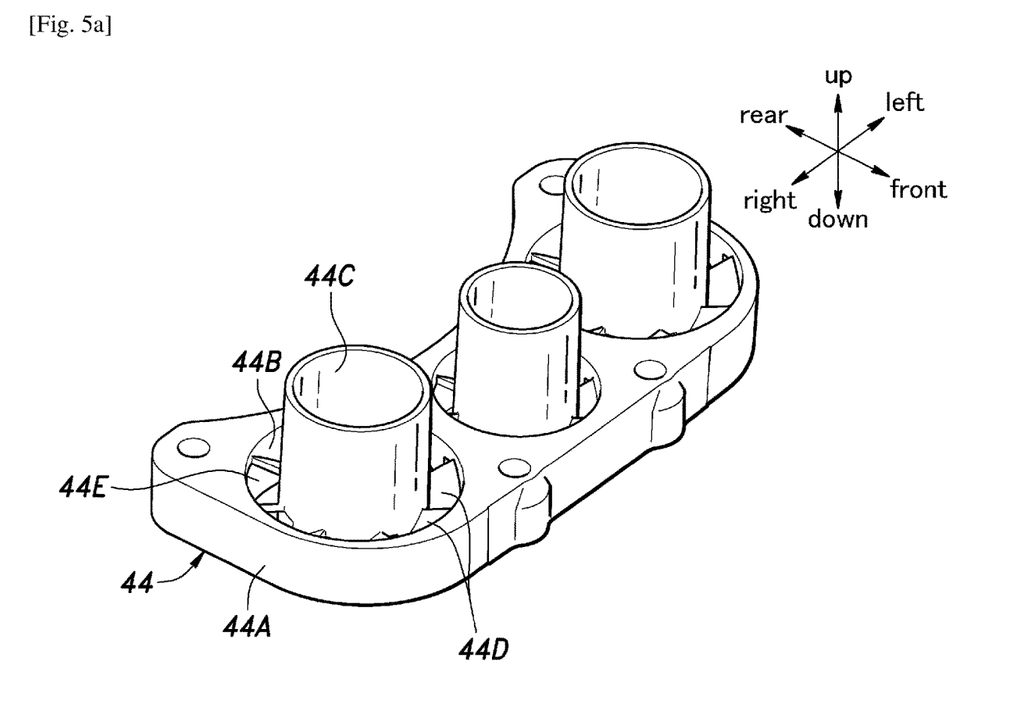
FIG. 5a is a perspective view of a passage member of the air cleaner with a flange part thereof omitted from the illustration.
Figure 5B:
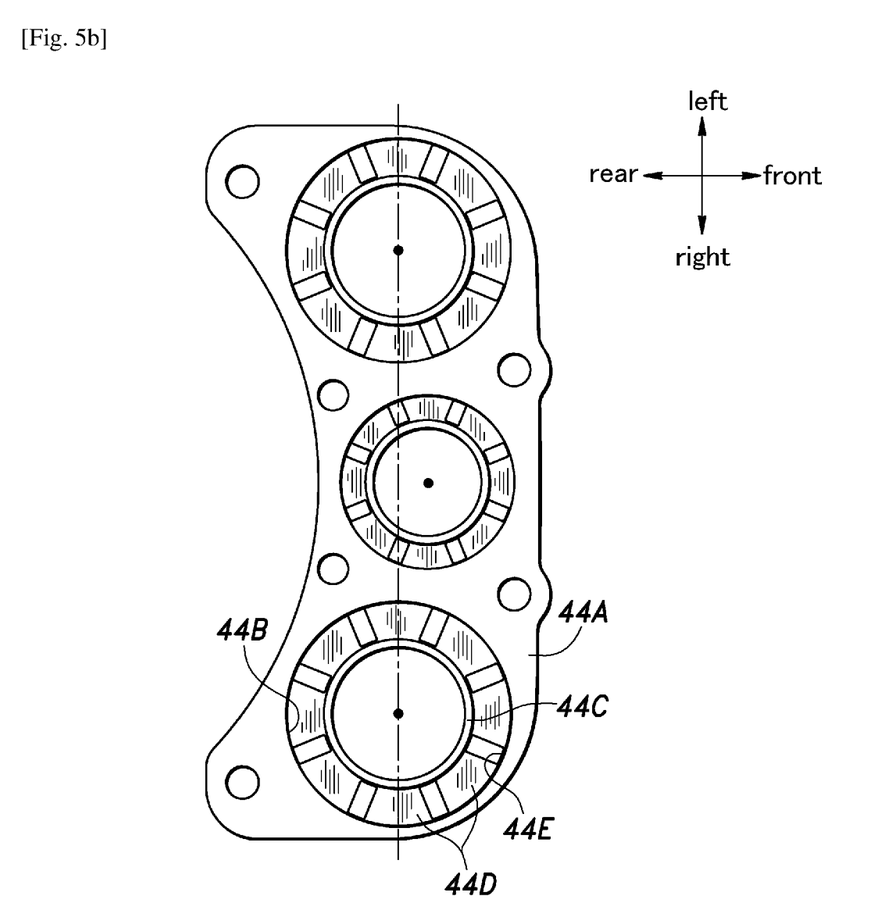
FIG. 5b is a plan view of the passage member with the flange part thereof omitted from the illustration.

An air ejection pipe 44C is positioned centrally in each circular hole 44B, and is supported by the base portion 44A via a plurality of guide vanes 44D extending radially between the outer circumferential surface of the air ejection pipe 44C and the opposing inner circumferential surface of the corresponding circular hole 44B. Therefore, an annular air inlet passage 44E is defined between the air ejection pipe 44C and the circular hole 44B all in a concentric arrangement. Each guide vane 44D is slanted with respect to the axial line of the air inlet passage 44E in such a manner that the air flowing downward in the air inlet passage 44E is rotated in the clockwise direction around the central axial line of the air inlet passage 44E when viewed from above.

The upper ends of the air ejection pipe 44C are commonly connected to a flange 44F defining a horizontal upper surface. The peripheral part of the upper surface of the flange 44F abuts the shoulder surface 73 of the cover member 42 and the partition wall 66 so that the interior of each air ejection pipe 44C is communicated with the connecting chamber 75, and the passage chamber 76 is separated from the connecting chamber 75 by the air ejection pipes 44C. In the illustrated embodiment, the base portion 44A, the guide vanes 44D and the air ejection pipes 44C are formed by an integrally molded plastic member, and the flange 44F is formed by a separately molded plastic member. The upper ends of the air ejection pipes 44C are press fitted into, welded to or otherwise connected to the corresponding holes of the flange 44F in an air tight manner. Alternatively, the base portion 44A, the guide vanes 44D, the air ejection pipes 44C and the flange 44F are formed by an integrally molded plastic member.

As shown in FIGS. 4 and 6, the case member 45 includes an upper plate portion 45A having an upper surface abutting the lower surface of the base portion 44A and three cup portions 45B recessed downward in positions corresponding to the lower ends of the respective air inlet passages 44E and opening out upward. Each cup portion 45B may be provided with a conical shape with a downward taper. The peripheral part of the upper plate portion 45A extends outward slightly beyond the peripheral edge of the base portion 44A. A downwardly facing annular shoulder surface 78 is formed in the rear surface of the front wall 62, the right surface of the left side wall 64, the left surface of the right side wall 65 and the front surface of the partition wall 66. With the peripheral part of the upper surface of the upper plate portion 45A brought into close contact with the shoulder surface 78, a plurality of screws 82 are passed through holes formed in the peripheral parts of the upper plate portion 45A and the base portion 44A, and threaded into corresponding plate nuts 81 fixedly secured to the front wall 62 and the partition wall 66. Thereby, the case member 45 and the passage member 44 are fixedly secured to the cover member 42. The passage member 44 is thus interposed between the shoulder surface 73 jointly defined by the lower surface of the passage wall 71 and the lower surface of the flange 66A, and the upper surface of the upper plate portion 45A.

The interior of each cup portion 45B defines a separation chamber 45C, and a peripheral left front part of the bottom part of each cup portion 45B is formed with a tangentially extending dust ejection hole 45D. The case member 45 is made of transparent plastic material so that the interior of the separation chamber 45C is visible from outside.

As shown in FIGS. 4 to 8, the three cyclone dust collection units 34 are formed by the respective air inlet passages 44E, guide vanes 44D and air ejection pipes 44C formed by the passage member 44 and the case member 45. The three cyclone dust collection units 34 are arranged laterally, and the cyclone dust collection unit 34 in the middle is located centrally of the base portion 44A with respect to the lateral direction while the remaining two cyclone dust collection units 34 are located symmetric to each other with respect to the central cyclone dust collection unit 34. The central axial line of the central cyclone dust collection unit 34 and the central axial line of the filter element 43 are located on a central line of the air cleaner extending in the fore and aft direction. In each cyclone dust collection unit 34, the circular hole 44B, the air inlet passage 44E, the separation chamber 45C and the air ejection pipe 44C are disposed coaxially to one another. The three cyclone dust collection units 34 are located on the front end of the air cleaner 32, and the central axial lines of the three cyclone dust collection units 34 extend in parallel with the axial line of the filter element 43 and are arranged along the circumferential direction of the filter element 43.

The central cyclone dust collection unit 34 has a smaller diameter than the remaining two cyclone dust collection units 34 in such a manner that the space defined between the rectangular outer profile of the air cleaner 32 and the circular outer profile of the filter element 43 may be fully utilized. The diameters of the air inlet passage 44E, the air ejection pipe 44C and the cup portion 45B of each cyclone dust collection unit 34 are dimensioned in proportion to the overall diameter of the cyclone dust collection unit 34.

As shown in FIGS. 7 and 8, the central axial line of the central cyclone dust collection unit 34 and the central axial line of the filter element 43 extend vertically in parallel to each other, and are located on the central line of the air cleaner 32 extending in the fore and aft direction. The front ends of the three cyclone dust collection units 34 are aligned with each other with respect to the fore and aft direction while the central axial line of the central cyclone dust collection unit 34 is offset in the forward direction relative to the central axial lines of the remaining cyclone dust collection units 34. Thus, the rear end of the central cyclone dust collection unit 34 is significantly offset in the forward direction relative to the rear ends of the remaining cyclone dust collection units 34.

The combined lateral width of the three cyclone dust collection units 34 is substantially equal to the internal lateral width of the cover member 42 (distance between the left side wall 64 and the right side wall 65). In a preferred embodiment, the combined lateral width of the three cyclone dust collection units 34 is substantially equal to the diameter of the filter element 43.

As shown in FIGS. 1 and 2, the rear end of the air cleaner 32 is located at a substantially same position as the rear end of the engine main body 2 with respect to the fore and aft direction. The rear end of the protective cover 28B of the muffler 28A is also located at a substantially same position as the rear end of the engine main body 2 with respect to the fore and aft direction. The right end of the air cleaner 32 is located slightly to the left of the right end of the engine cover 23. The upper end of the air cleaner 32 is located at a substantially same elevation as the upper end of the fuel tank 27. In other words, the air cleaner 32 is positioned so as not to project beyond the generally rectangular outer profile of the engine 1.

The mode of operation of the air cleaner 32 described above is discussed in the following. During the operation of the engine 1, the negative pressure created in the cylinder 5 is transmitted to the outlet passage 41B so that intake air is drawn into the passage chamber 76 of the air cleaner 32 via the air inlet 31. The intake air introduced into the passage chamber 76 passes through one of the cyclone dust collection units 34. In each cyclone dust collection unit 34, as the air flows downward from the air inlet passage 44E to the separation chamber 45C, the guide vanes 44D produce a swirl flow turning in clockwise direction when viewed from above and centered around the axial center of the cyclone dust collection unit 34. In the separation chamber 45C, dust in the air is forced radially outward by the centrifugal force, and drops down to be expelled from the dust ejection hole 45D to the outside while the air freed from the dust flows upward from the separation chamber 45C to the connecting chamber 75 via the air ejection pipe 44C. The air that has passed through the cyclone dust collection units 34 merges in the connecting chamber 75, and flows into the filter chamber 70 of the filter dust collection unit 35. In the filter chamber 70, the air passes through the filter element 43 in the radially inward direction, and foreign matters in the air are trapped by the filter element 43. The air that has passed through the filter element 43 is forwarded to the carburetor 33 via the outlet passage 41B.

Figure 9:
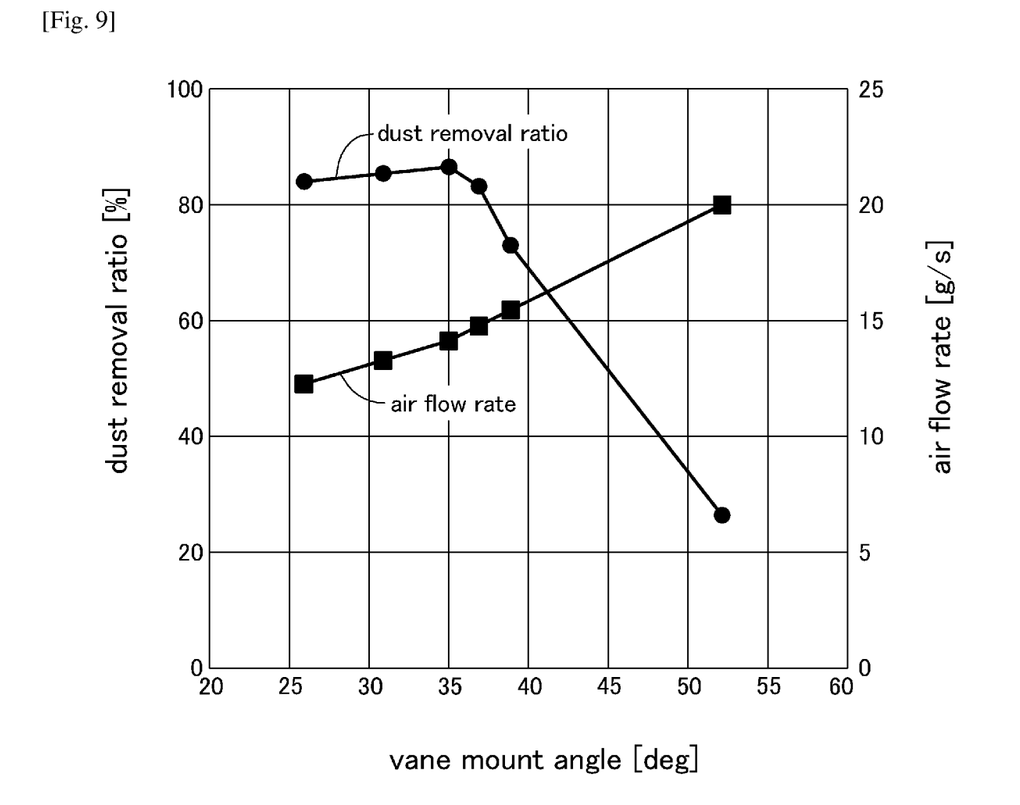
FIG. 9 is a graph showing the relationships of the intake flow rate and dust removal ratio to the mounting angle of guide vanes.

In the illustrated embodiment, there are eight guide vanes 44D in each air inlet passage 44E which are arranged at a regular interval along the circumferential direction. The guide vanes 44D are arranged in a non-overlapping relationship when viewed in the axial direction for the convenience of manufacture. The angle (mounting angle) of each guide vane 44D with respect to a horizontal plane perpendicular to the axial line is in the range of 30 degrees to 37 degrees. FIG. 9 shows the changes in the air flow rate and the dust removal ratio in relation with this mounting angle. This graph was obtained by computational analysis based on the assumption that the outer diameter, the inner diameter and the length of the vanes 44D are 40 mm, 27 mm and 10 mm, respectively, the inner diameter and the length of the air ejection pipe 44C are 24 mm and 34 mm, respectively, the diameter and the length of the separation chamber 45C are 40 mm and 40 mm, respectively, and the pressure on the downstream side of the air ejection pipe is −400 Pa. As can be seen from FIG. 9, the air flow rate increases with an increase in the mounting angle of the guide vanes 44D presumably because the flow resistance of the guide vanes 44D decreases with an increase in the mounting angle. Meanwhile, the dust removal ratio is substantially constant in relation with the mounting angle when the mounting angle is smaller than 37 degrees, but starts declining sharply as the mounting angle increases beyond 37 degrees. It can be surmised that increasing the mounting angle diminishes the circumferential speed of the air that passes through the air inlet passage 44E, and hence diminishes the centrifugal force that is effective in separating dust from the air. Based on these factors, in view of achieving a high dust removal ratio while maintaining a relatively high air flow rate, it is preferable to increase the mounting angle of the guide vanes 44D without exceeding 37 degrees, and to select the mounting angle from a range of 30 degrees to 37 degrees, for instance.

Because the air cleaner 32 of the illustrated embodiment is provided with the three cyclone dust collection units 34 for the single filter dust collection unit 35 provided with the annular filter element 43, and the middle cyclone dust collection unit 34 is smaller in diameter than the remaining cyclone dust collection units 34 on either side, the filter dust collection unit 35 and the cyclone dust collection units 34 can be accommodated in a rectangular space in an efficient manner, and this contributes to a compact design of the air cleaner having a prescribed performance level. As the outer profile of the air cleaner 32 is rectangular, the layout of the various associated components of the engine 1 such as the fuel tank 27 and the muffler 28A may be optimized, and the engine 1 can be designed as a highly compact unit.

Because the dust ejection holes 45D of the cyclone dust collection units 34 are all directed in the front right direction, the dust expelled from the respective dust ejection holes 45D can be smoothly guided away from the engine 1 sideways without the individual flows of dust interfering with one another. The front right direction in which the dust is expelled from the cyclone dust collection units 34 faces away from the rear right direction in which the operator of the engine 1 is situated so that the dust expelled from the cyclone dust collection units 34 does not cause discomfort to the operator.

Because the cooling air outlet 23A is positioned under the cyclone dust collection units 34, and an air flow is thereby created along the upper surface of the engine main body 2, the dust expelled from the cyclone dust collection units 34 is prevented from being deposited on the upper surface of the engine main body 2.

According to the illustrated embodiment, because the cyclone dust collection units 34 are formed by combining three pieces, the cover member 42, the passage member 44 and the case member 45, the assembling and disassembling of the cyclone dust collection units 34 can be simplified. When the case member 45 is made of transparent material, the amount of dust collected in each separation chamber 45C can be visually inspected from outside.

Figure 10:
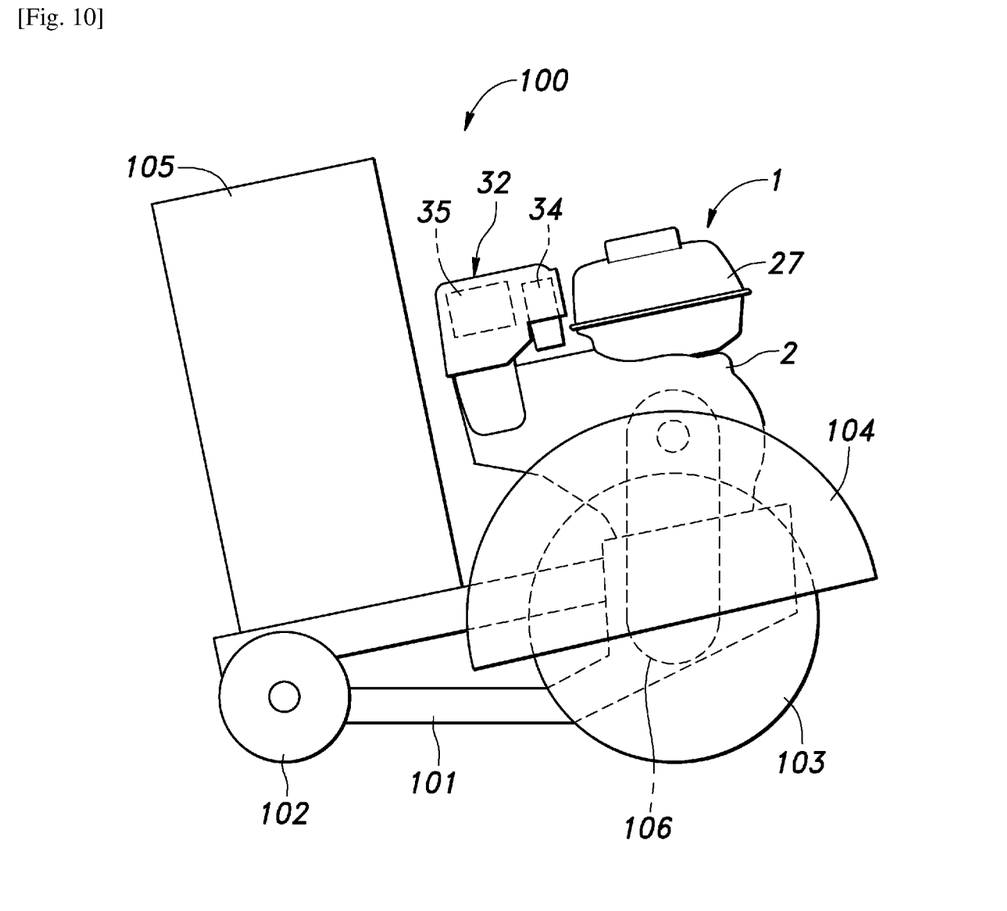
FIG. 10 is a simplified side view showing a concrete cutter fitted with the engine of the illustrated embodiment.

The engine 1 constructed as discussed above may be advantageously applied to a concrete cutter 100, for instance. As shown in FIG. 10, the concrete cutter 100 includes a frame 101 extending in the fore and aft direction, a pair of wheels 102 provided in the rear end of the frame 101, a cutting disk 103 supported by the front end of the frame 101 so as to be rotatable around a rotational center line extending laterally, a cutting disk cover 104 attached to the frame 101 to cover an upper part of the cutting disk 103, and a water tank supported on top of a rear part of the frame 101. The engine 1 is supported on top of a front part of the frame 101 in such a manner that the crankshaft 10 extends laterally, and the crankcase 4 is located ahead of the cylinder head 7. The output end of the crankshaft 10 of the engine 1 is connected to the center shaft of the cutting disk 103 via a power transmitting device 106 such as a belt-pulley system. In the engine 1 of the illustrated embodiment, the air cleaner 32 is positioned so as not to project from the rear end of the engine main body 2. Thereby, the fore and aft length of the engine 1 may be minimized. Therefore, even when the water tank 105 is positioned in the rear part of the frame 101, and the space available for the engine 1 may be limited, it is possible to install the engine on the frame in a spatially efficient manner.

The air cleaner of the present is particularly advantageous for applications where the engine 1 can be subjected to a dusty environment as is the case with concrete cutters. The use of the cyclone dust collection units 34 in the air cleaner 32 is highly effective in collecting dust before the fresh intake air is introduced into the filter element so that the service life of the filter element can be extended, and the performance of the engine 1 can be maintained over an extended period time without requiring frequent replacement of the filter element and the associated expenses.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. An air cleaner for an internal combustion engine, comprising: a base member including a base wall extending substantially horizontally, the base wall defining an outlet passage in a central part thereof;
   a cover member including a rectangular upper wall, a tubular side wall including a front wall, a rear wall, a left side wall and a right side wall and depending from the rectangular outer edge of the upper wall, a partition wall extending between the left sidewall and the right side wall, and a passage wall depending from the front part of the lower surface of the upper wall, the cover member being attached to an upper side of the base wall, the rear parts of the side walls, the partition wall, the upper wall and the base wall jointly defining a filter chamber, the upper wall and the passage wall jointly defining a connecting chamber extending from an upper part of the filter chamber in a prescribed direction, the front wall, the partition wall, the front part of the left side wall and the front part of the right side wall jointly defining a passage chamber connected to a lower end of the connecting chamber via a communication hole, the front wall having an air inlet communicating the passage chamber with outside;
   a substantially annular filter element positioned on the base wall inside the filter chamber and having an internal space communicating with the outlet passage;
   a passage member including a plate-like base portion defining a lower end of the passage chamber, a plurality of circular holes passed through the base portion, a plurality of air ejection pipes having upper ends jointly connected to the communication hole in an air tight manner and extending through the corresponding circular holes of the base portion in a coaxial manner, an annular air inlet passage defined between each air ejection pipe and the corresponding circular hole, and a plurality of guide vanes extending radially between an outer circumferential surface of each air ejection pipe and an inner circumferential surface of the corresponding circular hole; and
   a case member attached to a lower end of the passage member and defining cylindrical or conical separation chambers communicating with the respective annular air inlet passages and with lower ends of the respective air ejection pipes,
   wherein the passage chamber is disposed inside the cover member and is communicated with outside through the air inlet,
   the passage chamber distributes air taken in from the air inlet to the plurality of separation chambers through the plurality of circular holes passed through the base portion, and
   the plurality of ejection pipes connects the plurality of separation chambers with the communication hole.

2. The air cleaner according to claim 1, wherein the passage member comprises a flange that is commonly connected to the upper ends of the air ejection pipes, the flange having a peripheral part that abuts an annular shoulder surface facing downward provided along a periphery of the communication hole.

3. The air cleaner according to claim 2, wherein the passage member is interposed between the cover member and the case member.

4. The air cleaner according to claim 3, wherein an upper end of the case member abuts a lower surface of a peripheral part of the base portion and an annular shoulder surface facing downward defined by the cover member.

5. The air cleaner according to claim 4, wherein the guide vanes are arranged in each annular air inlet passage at a regular angular interval, and are inclined with respect to a plane perpendicular to an axial direction of the corresponding annular air inlet passage by an angle of 30 degrees to 37 degrees.

6. The air cleaner according to claim 5, wherein the guide vanes are configured not to overlap one another as seen in the axial direction of the corresponding annular air inlet passage.

7. The air cleaner according to claim 6, wherein the separation chambers are defined by respective cup members projecting downward from a common flange provided in an upper end of the case member.

* * * * *